United States Patent
Yokoyama et al.

(10) Patent No.: US 10,293,800 B2
(45) Date of Patent: May 21, 2019

(54) BRAKE SYSTEM

(71) Applicant: HITACHI AUTOMOTIVE SYSTEMS, LTD., Ibaraki (JP)

(72) Inventors: Wataru Yokoyama, Kawasaki (JP); Kimio Nishino, Atsugi (JP); Kenichiro Matsubara, Kasumigaura (JP); Hiroshi Chikuma, Matsudo (JP); Kenji Hashida, Zama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/111,375

(22) PCT Filed: Dec. 26, 2014

(86) PCT No.: PCT/JP2014/084570
§ 371 (c)(1),
(2) Date: Jul. 13, 2016

(87) PCT Pub. No.: WO2015/115019
PCT Pub. Date: Aug. 6, 2015

(65) Prior Publication Data
US 2016/0339888 A1 Nov. 24, 2016

(30) Foreign Application Priority Data

Jan. 31, 2014 (JP) .................................. 2014-017621

(51) Int. Cl.
*B60T 13/10* (2006.01)
*B60T 13/66* (2006.01)
(Continued)

(52) U.S. Cl.
CPC ............ *B60T 13/662* (2013.01); *B60T 7/042* (2013.01); *B60T 13/588* (2013.01);
(Continued)

(58) Field of Classification Search
CPC ............................. B60T 13/662; B60T 13/741
(Continued)

(56) References Cited

U.S. PATENT DOCUMENTS

| | | | | |
|---|---|---|---|---|
| 3,887,899 A | * | 6/1975 | Kawaguchi | B60T 8/26 188/1.11 E |
| 4,345,796 A | * | 8/1982 | Reinecke | B60T 8/885 303/122.06 |

(Continued)

FOREIGN PATENT DOCUMENTS

| | | |
|---|---|---|
| JP | 2-60067 | 5/1990 |
| JP | 2001-106057 | 4/2001 |

(Continued)

OTHER PUBLICATIONS

International Search Report dated Mar. 31, 2015 in International Application No. PCT/JP2014/084570.
(Continued)

*Primary Examiner* — Christopher P Schwartz
(74) *Attorney, Agent, or Firm* — Wenderoth, Lind & Ponack, L.L.P.

(57) ABSTRACT

A parking brake controller (19) activates an electric actuator (43) in response to operation of a parking switch (18) to hold a disc brake (31) to serve as a parking brake. If a failure (fault) is detected in the parking switch (18), the parking brake controller (19) activates the electric actuator (43) so as to hold the parking brake automatically upon detecting a condition that presumes the vehicle operator's intent not to drive any longer while the vehicle is at rest.

20 Claims, 7 Drawing Sheets

(51) Int. Cl.
*B60T 7/04* (2006.01)
*B60T 13/58* (2006.01)
*B60T 13/74* (2006.01)
*F16D 55/226* (2006.01)
*F16D 65/18* (2006.01)
*F16D 121/24* (2012.01)

(52) U.S. Cl.
CPC .......... *B60T 13/741* (2013.01); *F16D 55/226* (2013.01); *F16D 65/18* (2013.01); *F16D 2121/24* (2013.01)

(58) Field of Classification Search
USPC ................ 188/2 D, 156–164; 303/3, 15, 20, 303/122.03, 122.14
See application file for complete search history.

(56) References Cited

U.S. PATENT DOCUMENTS

| | | | | |
|---|---|---|---|---|
| 4,837,552 A * | 6/1989 | Vandemotter | ........... | B60T 8/885 303/122.05 |
| 6,161,904 A * | 12/2000 | Schmidt | .................. | B60T 7/042 303/122.04 |
| 6,317,675 B1 * | 11/2001 | Stolzl | ...................... | B60T 7/042 303/155 |
| 6,663,195 B1 * | 12/2003 | Arnold | .................... | B60T 7/042 303/122.03 |
| 6,701,242 B1 * | 3/2004 | Diebold | .................. | B60T 7/042 188/156 |
| 8,041,475 B2 * | 10/2011 | Fujita | ........................ | B60T 7/12 303/191 |
| 8,128,530 B2 * | 3/2012 | Hecht | .................. | F16H 63/483 477/101 |
| 2008/0262687 A1 * | 10/2008 | Fujita | ........................ | B60T 7/12 701/70 |
| 2009/0195058 A1 * | 8/2009 | Jackson | .................. | B60T 7/122 303/20 |
| 2010/0138105 A1 * | 6/2010 | Shibasaki | ............... | B60T 17/22 701/29.2 |
| 2011/0071723 A1 * | 3/2011 | Bechtler | ................ | B60Q 1/441 701/29.1 |
| 2013/0314222 A1 * | 11/2013 | Park | ........................ | B60Q 1/00 340/453 |

FOREIGN PATENT DOCUMENTS

| | | | | |
|---|---|---|---|---|
| JP | 2006160203 | * | 6/2006 | ............. B60T 17/22 |
| JP | 2006-224739 | | 8/2006 | |
| JP | 2006-306350 | | 11/2006 | |
| JP | 2008-265551 | | 11/2008 | |
| JP | 2013-112167 | | 6/2013 | |

OTHER PUBLICATIONS

Office Action dated Apr. 4, 2017 in Japanese patent application No. 2015-559788 with partial English translation.

* cited by examiner

_US 10,293,800 B2_

BRAKE SYSTEM

TECHNICAL FIELD

The present invention relates to a brake system for applying braking force to a vehicle.

BACKGROUND ART

Brake systems on automobiles and other vehicles are known that comprise: for example, a brake mechanism for applying braking force by bringing friction members (pads, shoes) into contact with rotating members (discs and drums) rotating with the vehicle, based on operation of the brake pedal; and a parking mechanism for applying braking force by actuating (rotating) an electric motor, based on operation of a parking switch (parking brake switch) when the vehicle is stopped, parked, or the like (see Patent Document 1).

CITATION LIST

Patent Document

Patent Document 1: Japanese Patent Publication No. 2013-112167

SUMMARY OF INVENTION

Prior art disclosed in Patent Document 1 may not be able to hold (apply) the parking brake when the parking switch fails, causing inconvenience.

An object of the present invention is to provide a brake system that holds its parting brake in the event of a parking switch failure.

To achieve this object, a brake system according to the present invention comprises: a brake mechanism for propelling a friction member with the aid of a pressing member, based on operation of a brake pedal, the friction member being disposed to come into contact with a rotating member rotating with a wheel of a vehicle; a parking mechanism operated with an electric motor to hold the wheel non-rotatably and release it; and control means for actuating the electric motor in accordance with operation of the parking switch for holding or releasing the parking mechanism.

The control means of the brake system of the present invention comprises parking-switch fault detecting means for detecting any fault in the parking switch. If a fault is detected in the parking switch by the parking-switch fault detecting means, the electric motor is actuated so as to hold the parking mechanism when the brake pedal has been stepped on for predetermined time while the vehicle is at rest or upon detecting a condition that presumes the vehicle operator's exit from the vehicle while it is at rest.

The control means of the brake system of the present invention comprises parking-switch fault detecting means for detecting any fault in the parking switch. If a fault is detected in the parking switch by the parking-switch fault detecting means, the electric motor is actuated so as to hold the parking mechanism upon detecting a condition that presumes the vehicle operator's intent not to drive any longer while the drive unit of the vehicle is in drivable state and the vehicle is at rest.

The brake system of the present invention holds the parking brake in the event of a parking switch failure to keep the vehicle stationary.

DESCRIPTION OF EMBODIMENTS

Figure 4:
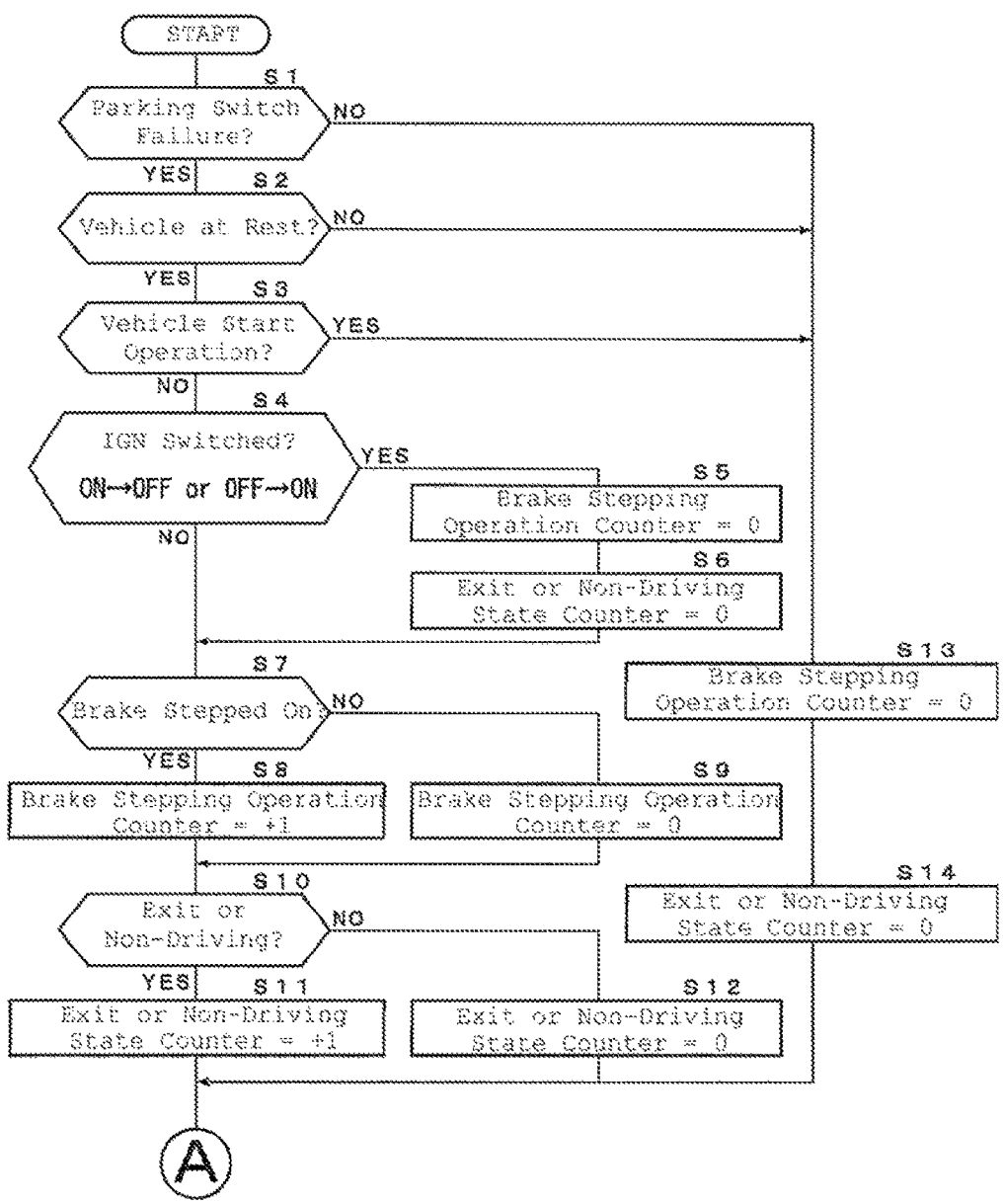
FIG. 4 is a flowchart of a control process carried out by the parking brake controller.
Figure 5:
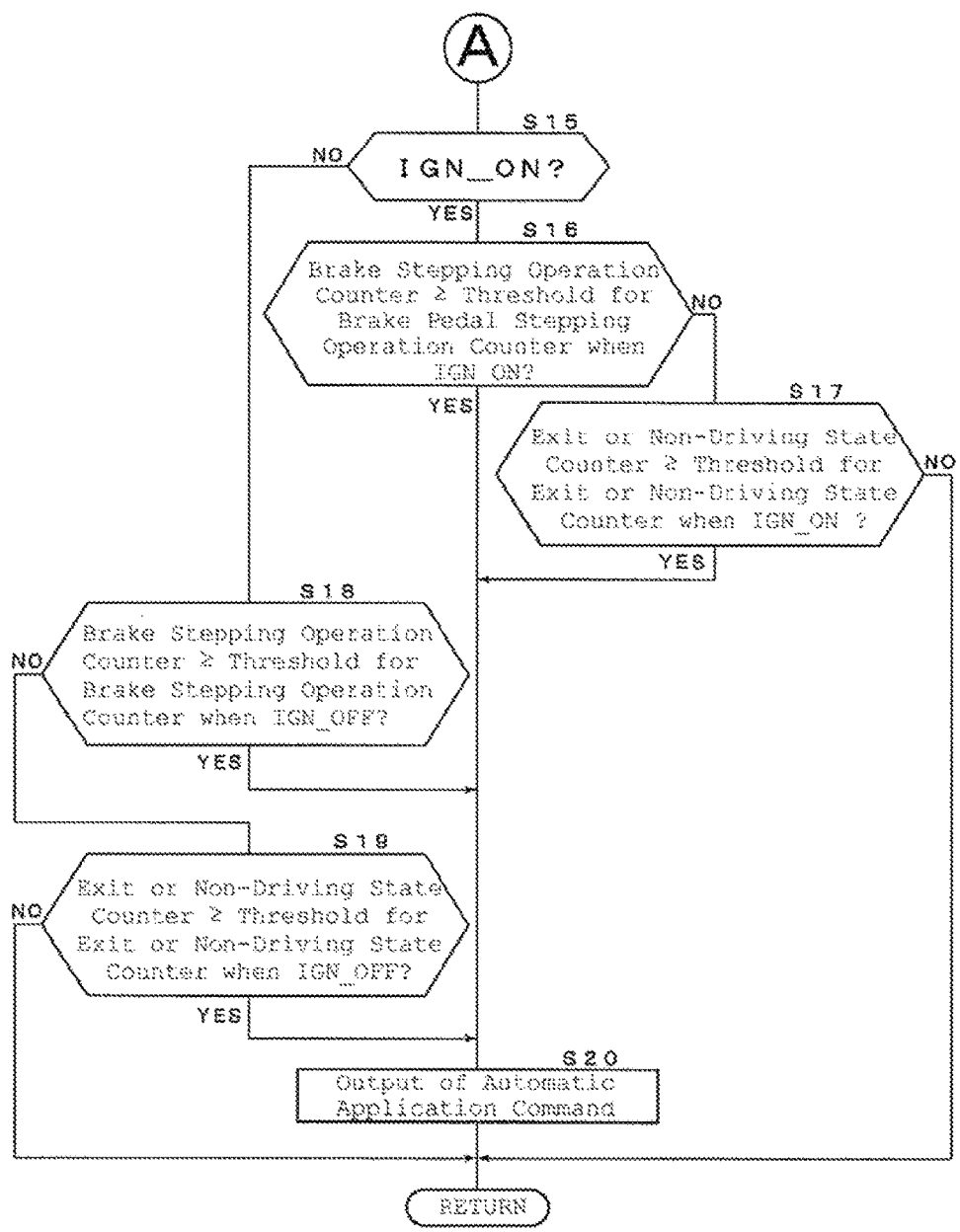
FIG. 5 is a sequel to the flowchart of FIG. 4.
Figure 6:
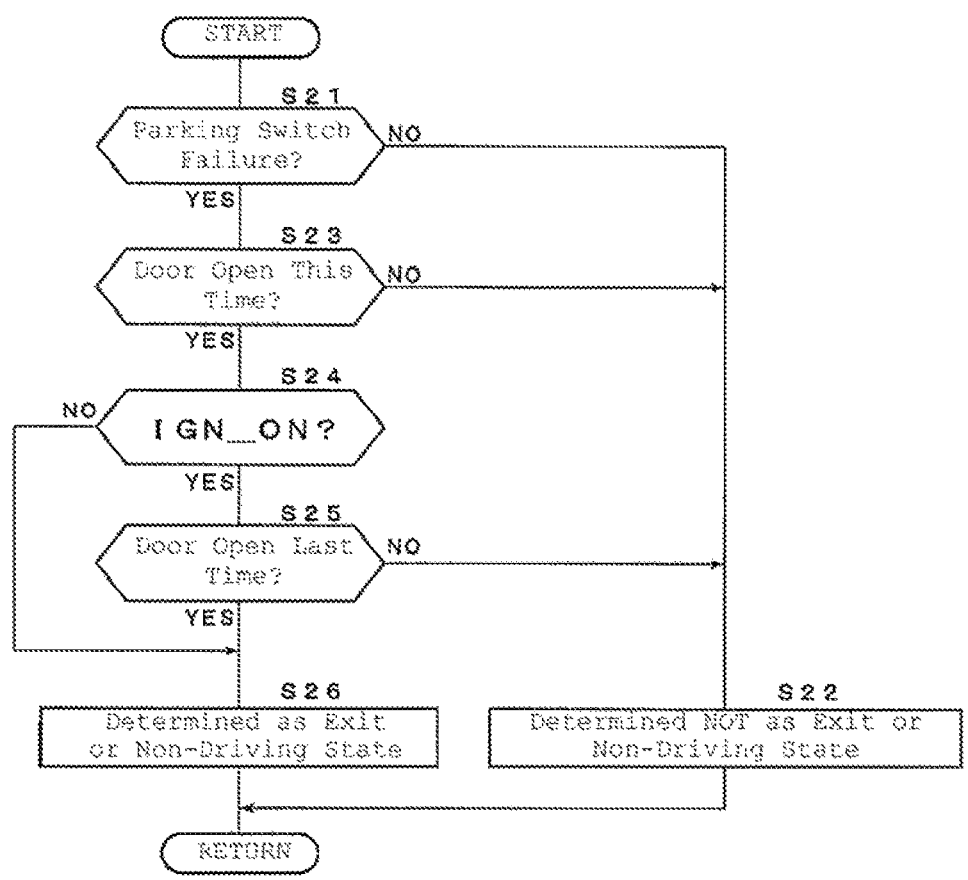
FIG. 6 is a flowchart of a process of determination for exit or non-driving state according to a second embodiment.

Below, the brake system of each embodiment as fitted on a four-wheeled vehicle is described by way of example with reference to the accompanying drawings. Each step in the flowcharts of FIGS. 4 to 6 is indicated by the letter "S," e.g., S1 for step 1.

Figure 1:
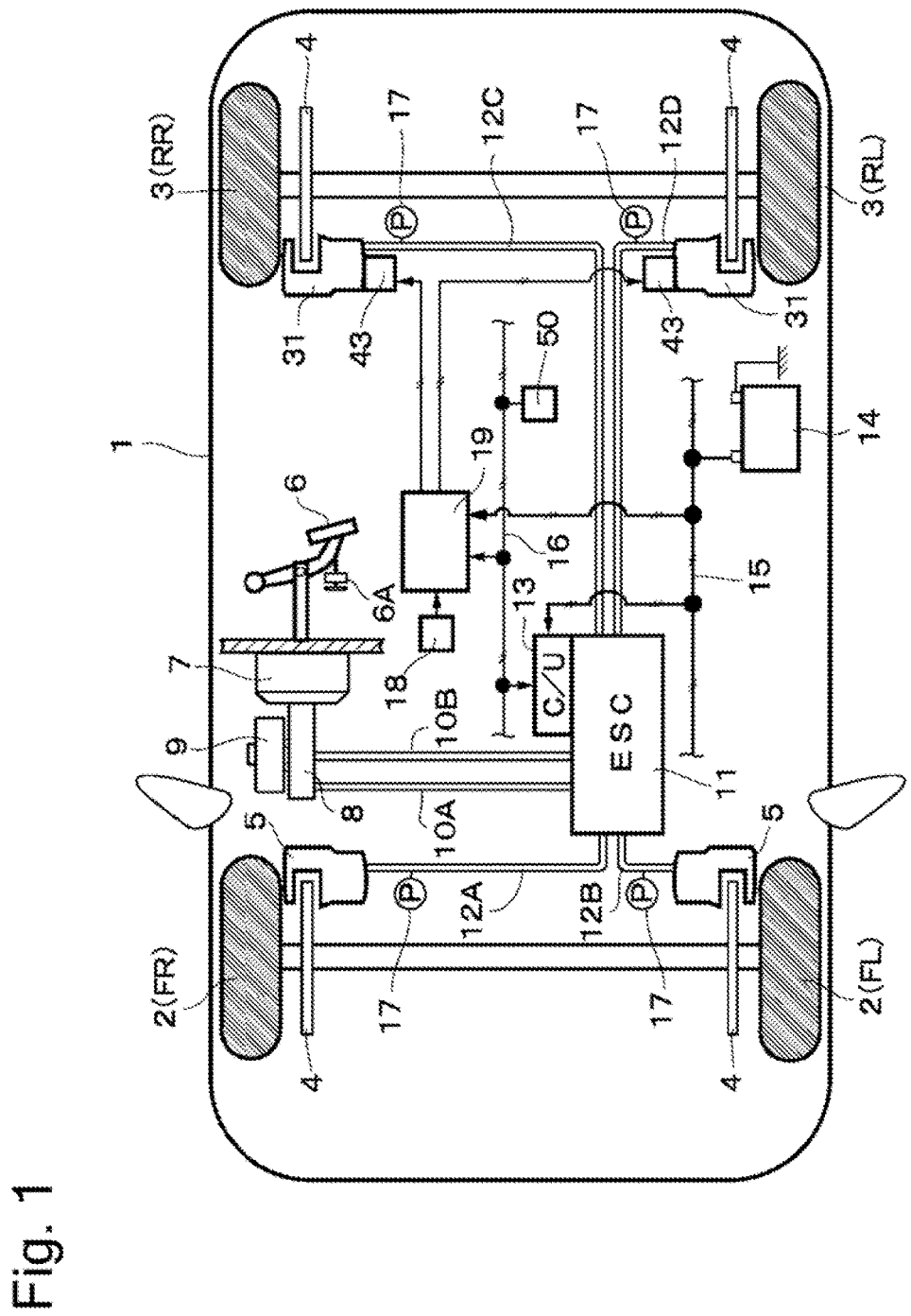
FIG. 1 is a schematic view of a vehicle fitted with a brake system according to a first embodiment.

FIGS. 1 to 5 show the first embodiment. In FIG. 1, a vehicle body 1 is fitted with four wheels on the bottom (road surface) side thereof, e.g., left and right front wheels 2 (FL, FR) and left and right rear wheels 3 (RL, RR). Each of the front wheels 2 and the rear wheels 3 is fitted with a disc rotator 4, serving as a rotating member (disc) rotating with the respective wheel (each of the front and rear wheels 2 and 3). To the disc rotor 4 at each of the front wheels 2 is applied braking force by a hydraulic disc brake 5, and to the disc rotor 4 at each of the rear wheels 3 is applied braking force by a hydraulic disc brake 31 with an electric parking brake function. As such, braking force is applied to each wheel (each of the front and rear wheels 2 and 3) independent of the other wheels.

A brake pedal 6 is fitted on a front board side of the vehicle body 1. The brake pedal 6 is stepped on by the vehicle operator in a vehicle braking operation, based upon which braking force on a service brake is applied and released. The brake pedal 6 is fitted with a brake lamp switch, a pedal switch, and a brake pedal operation sensor (brake sensor) 6A, such as a pedal stroke sensor. The brake pedal operation sensor 6A detects the present or absence of operation of stepping on the brake pedal 6 and the amount of operation and outputs a corresponding detection signal to a controller 13 for a hydraulic-pressure supply device. The detection signal from the brake pedal operation sensor 6A is transmitted (to the parking brake controller 19), for example via a vehicle data bus 16 or a signal line (not shown) connecting the controller 13 for a hydraulic-pressure supply device and a parking brake controller 19.

The stepping operation on the brake pedal 6 is transmitted via a booster 7 to a master cylinder 8 serving as a hydraulic source. The booster 7 is a vacuum booster or an electric booster provided between the brake pedal 6 and the master cylinder 8. The stepping force by the operation of stepping on the brake pedal 6 is boosted before transmitted to the master cylinder 8. The master cylinder 8 then generates hydraulic pressure in brake fluid supplied from a master reservoir 9. The master reservoir 9 comprises a working-fluid tank containing brake fluid. The mechanism for generating hydraulic pressure in response to the brake pedal 6 is not limited to the one described above and may be any other mechanism for generating hydraulic pressure in response to operation of brake pedal 6, for example, a brake-by-wire mechanism.

The hydraulic pressure generated in the master cylinder 8 is transmitted, for example via a pair of cylinder-side hydraulic lines 10A and 10B to the hydraulic-pressure supply device 11 (hereinafter "ESC 11"). The ESC 11 distributes the hydraulic pressure from the master cylinder 8 via brake-side lines 12A, 12B, 12C, and 12D to each of disc brakes 5 and 31. In this way, braking force is applied to the wheels (front and rear wheels 2 and 3) individually.

The ESC 11 is provided between the disc brakes 5 and 31 and the master cylinder 8. The ESC 11 is capable of operating independent of the amount of operation of the brake pedal 6 to supply hydraulic pressure to the disk brake 5 and 31, that is, increases the hydraulic pressure at the disc brakes 5 and 31. The ESC 11 has a controller 13 for a hydraulic-pressure supply device (hereinafter "control unit 13") for controlling the operation of the ESC 11. The control unit 13 performs actuation control, such as opening and closing control valves (not shown) of the ESC 11 and rotating and stopping an electric motor (not shown) for a hydraulic pump, to increase, decrease, and hold brake hydraulic pressure transmitted through the brake-side lines 12A to 12D to the disc brakes 5 and 31. In this way, a variety of brake controls can be performed, such as boost control, braking-force distribution control, brake assist control, antilock brake control (ABS), antiskid control, traction control, vehicle stability control (including sideways slip control), and hill start assist control.

The control unit 13 comprises a microcomputer. The control unit 13 is supplied with electric power via a power line 15 from a battery 14. As shown in FIG. 1, the control unit 13 is connected to the vehicle data bus 16. The vehicle 1 is fitted with an ignition switch 50 serving as a vehicle starter switch for starting the drive unit of the vehicle and turning on and off power source for other appliances. Commands for turning on (energizing) and off (shutting) the ignition switch 50 are transmitted through the vehicle data bus 16. Below, the ignition switch 50 is referred to as the ignition. The ESC 11 may be replaced with a known ABS unit or dispensed with (omitted) by directly connecting the master cylinder 8 and the brake-side lines 12A to 12D.

The vehicle data bus 16, constituting a control area network (CAN) serving as a serial communication unit on the vehicle 1, performs multiplex communication with various vehicle electronics, the control unit 13, parking brake controller 19, etc., in the vehicle. Vehicle data to be transmitted through the vehicle data bus are data (vehicle data) in the form of an detection signal, for example from a steering angle sensor, accelerator sensor (accelerator pedal operation sensor), a throttle sensor, an engine RPM sensor, a brake sensor (pedal operation sensor 6A), an ignition switch 60, a wheel speed sensor, a vehicle speed sensor, an inclination sensor, a G sensor (acceleration sensor), a stereo camera, a millimeter-wave radar, a seatbelt sensor, a transmission sensor (shift sensor), a door sensor, a steering sensor (handle sensor), a seat sensor, an onboard camera, a pressure sensor 17, etc.

The pressure sensor 17 is fitted to each of the brake-side lines 12A, 12B, 12C, and 12D to individually sense the pressure (hydraulic pressure) of the respective line, namely, the hydraulic pressure (wheel cylinder hydraulic pressure in the caliper 34 (cylinder 36) corresponding to the pressure in the respective line. Alternatively, one or two pressure sensors 17 may be used, for example only on the cylinder-side hydraulic lines 10A and 10B between the master cylinder and ESC 11 (to sense the master cylinder hydraulic pressure).

The vehicle body 1 is provided therein with a parking switch (parking brake switch) 18 near the vehicle operator's seat (not shown). The parking switch 18 is operated by the vehicle operator. The parking switch 18 transmits a signal (actuation command signal) corresponding to the vehicle operator's demand for parking brake operation (for hold or release) to the parking brake controller 19. In other words, the parking switch 18 outputs to the parking brake controller 19 a signal (hold or release command signal) for holding or releasing a parking mechanism (rotary-to-linear motion converter 40), based on operation (rotation) of an electric actuator 43.

When the parking switch 18 is operated for braking (to turn the parking brake on), that is, when there is a hold demand (actuation demand) from the vehicle operator, electric power is supplied via the parking brake controller 19 to the disc brake 31 on the rear wheel 3 to rotate the electric actuator 43 for braking operation. This puts the disc brake 31 on the rear wheel 3 into a hold state (application state) in which braking force is applied to the disc brake 31 to act as a parking brake.

The present specification refers application of the parking brake, or application of braking force for parking, as "hold." The term "hold" is used, because the actuation of the electric actuator 43 applies certain pressing force (thrust) to a brake pad 33 so that the positions of a piston 39 and the brake pad 33 are held by the parking mechanism (rotary-to-linear motion converter 40).

When the parking switch 18 is operated to release the brake (to turn the parking brake off), that is, when a release demand is made from the vehicle operator, electric power is supplied via the parking brake controller 19 to the disc brake 31 to turn the electric actuator 43 in the opposite direction to that when actuating the brake. This puts the disc brake 31 on the rear wheel 3 in a release state in which braking force for parking is released.

The parking brake may be configured to automatically apply (hold) braking force on the basis of a automatic hold command from a logic for parking brake hold determination in the parking brake controller 19, for example when the vehicle is coming to stop (e.g., when the vehicle has been decelerating and running below 4 km/h for predetermined time), when the engine is stalled, when the shift lever (select lever, select switch) is put in P (parking), when a door is opened, when a seat belt is taken off, or the like. The parking brake may also be configured to automatically release braking force on the basis of an automatic release command from a logic for parking brake release determination in the parking brake controller 19, for example when the vehicle has started running (e.g., when the vehicle has accelerated from rest and been running at 5 km/h or faster for predetermined time), when the accelerator pedal is operated, when a clutch pedal is operated, when the shift lever is put into any gear position other than P or N (neutral), or the like. An automatic hold command from the parking brake controller 19 in the event of a failure of the parking switch 18 will be described later in detail.

Figure 2:
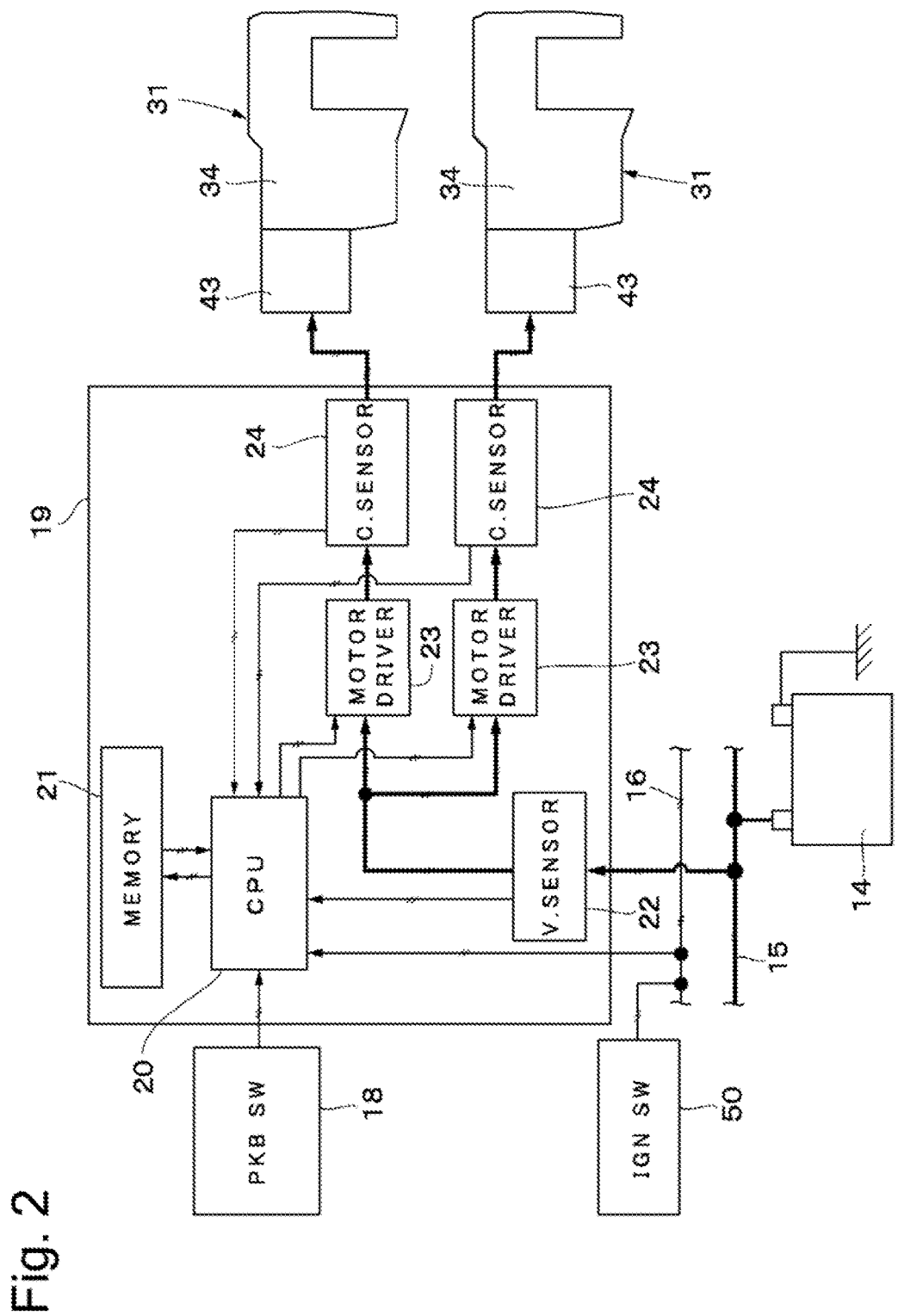
FIG. 2 is a block diagram of a parking brake controller of FIG. 1.

The parking brake controller 19 and a pair of left and right disc brakes 31 constitute a brake system (electric brake system). As shown in FIG. 2, the parking brake controller 19 has an operation circuit (CPU) 20 comprising a microcomputer, etc. The parking brake controller 19 is supplied with electric power through a power line 15 from a battery 14.

The parking brake controller 19 constitutes control means (controller, control unit). The parking brake controller 19 controls the electric actuator 43 to apply braking force (parking brake, auxiliary brake) at the time of parking the vehicle or bringing it to stop (or while running if needed). The parking brake controller 19 activates the electric actuator 43 in response to operation of the parking switch 18, logic for parking brake hold/release determination, or the like, thereby operating (for holding or releasing) the disc brake 31 serving as a parking brake (or an auxiliary brake as required).

In response to operation of the parking switch 18 by the vehicle operator, the parking brake controller 19 activates the electric actuator 43 on the basis of a signal (on/off signal) output from the parking switch 18, thereby holding (applying) or releasing the disc brake 31. The parking braking controller 19 may be configured to activate the electric actuator 43 for release or hold of the disc brake 31 on the basis of the logic for parking brake hold/release determination, instead of in response to a signal from the parking switch 18.

As described above, the parking brake controller 19 holds or releases the disc brake 31 in accordance with an "actuation command signal" for parking brake actuation (hold/release) when transmitted, namely, an "actuation command signal" including a signal from the parking switch 18 or a signal based on the logic for parking brake hold/release determination. This causes the parking mechanism (rotary-to-linear motion converter 40) at the disc brake 31 to hold or release the piston 39 and the brake pad 33 on the basis of actuation of the electric actuator 43. As such, the "actuation command signal" is a signal to causes the parking mechanism (rotary-to-linear motion converter 40) to hold or release the piston 39 and brake pad 33.

Figure 3:
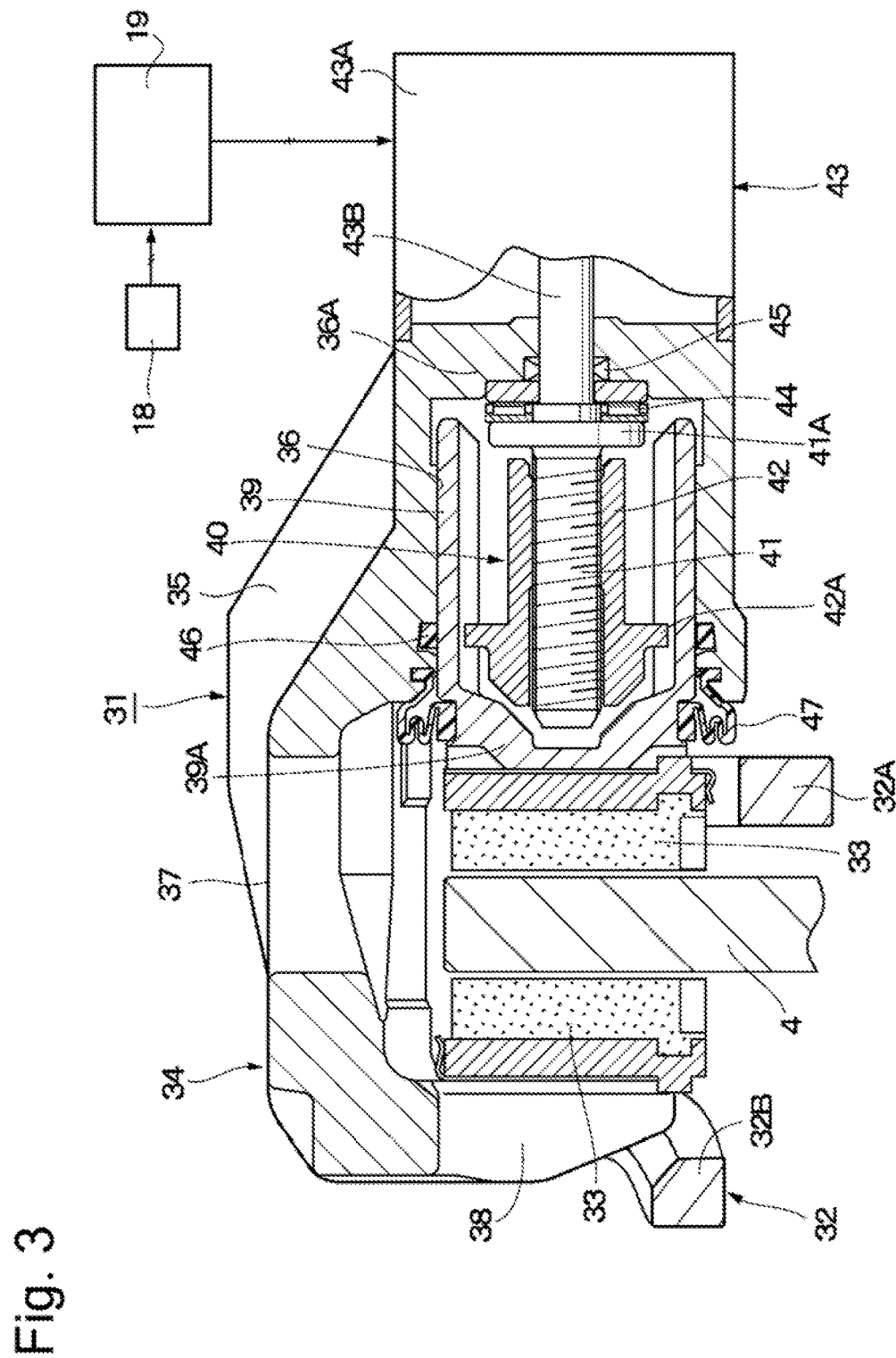
FIG. 3 is an enlarged longitudinal cross sectional view of a disc brake with an electric parking brake function, the disc brake being fitted on a rear wheel of FIG. 1.

As shown in FIGS. 1 to 3, the parking brake controller 19 is connected on its input side to the parking switch 18, etc. and on the output side to the electric actuator 43 of the disc brake 31, etc. More specifically, as shown in FIG. 2, the operational circuit (CPU) 20 of the parking brake controller 19 is connected to the parking switch 18, the vehicle data bus 6, a voltage sensor 22, a motor actuation circuit 23, current sensor 24, etc., as well as to a memory 21. The vehicle data bus 16 is capable of providing a variety of vehicle state quantities required for parking brake control (actuation), that is, a variety of vehicle data.

Instead of providing vehicle data through the vehicle data bus 16, such data may be provided by directly connecting sensors for taking such data to (the operational circuit 20) of the parking brake controller 19. The operational circuit 20 of the parking brake controller 19 may be configured to receive actuation command signals from the parking switch 18 and another controller (e.g., control unit 13) connected to the vehicle data bus 16.

In this case, for example, instead of the parking brake controller 19, other controller, e.g., the control unit 13, may be configured to determine parking brake hold/release with the aid of the determination logic. In other words, the control that would otherwise be performed by the parking brake controller 19 may be incorporated into the control unit 13.

The parking brake controller 19 comprises a memory (see FIG. 2) including, for example, a flash memory, ROM, RAM, EEPROM, or the like. The memory 21 stores a program for executing a process flow as shown in FIGS. 4 and 5, namely, a processing program for determining whether or not to hold (or apply braking force to) the disc brake 31 in the event of a failure of the parking switch 18, a threshold value for such determination, etc. The memory 21 also stores a "brake pedal stepping operation counter" value and an "exit or non-driving state counter" value in updatable form.

In this embodiment, the parking brake controller 19 is separate from the control unit 13 of the ESC 11, but may instead be integrated with it. The parking brake controller 19 controls two of the left and right disc brakes 31, but may instead be fitted to each of the left and right disc brakes 31. In the latter case, the parking brake controller 19 may be integrated with the respective disc brake 31.

As shown in FIG. 2, the parking brake controller 19 contains: a voltage sensor 22 for sensing voltage applied through the power line 15; left and right motor actuation circuits 23 for activating the left and right electric actuators 43; left and right current sensors 24 for sensing motor currents through the left and right electric actuators 43, etc. The voltage sensor 22, motor actuation circuits 23, and current sensors 24 are connected to the operational circuit 20.

This enables the operational circuit 20 of the parking brake controller 19 to stop the actuation of the electric actuators 43 on the basis of their motor current values, for example when holding (applying) or releasing the parking brake. When holding the parking brake, the operational circuit 20 identifies, for example, the instant at which the motor current value reaches a threshold for hold (an electric current value corresponding to a thrust required for hold) as the instant at which the piston 39 is put by the rotary-to-linear motion converter 40 into hold state, and then stops the electric actuator 43. When releasing the parking brake, the operational circuit 20 identifies, for example, the instant at which the motor current value reaches a predetermined release threshold as the instant at which the piston 39 is put by the rotary-to-linear motion converter 40 into release state, and stops the electric actuator 43.

In this embodiment, the parking brake controller 19 comprises parking-switch fault detecting means (S1 in FIG. 4) for sensing any fault (malfunction, failure) in the parking switch 19. This parking-switch fault detecting means detects any fault on the basis of a change in the voltage value of the parking switch 18. The vehicle operator's operation of the parking switch 18 induces a voltage change. For this reason, the parking brake controller 19 determines an operating condition (application, release, or non-operation) on the basis of a predetermined voltage value. The parking brake controller 19 detects a fault in the parking switch 18 (malfunction, failure) when the voltage value of the parking switch 18 deviates from a predetermined voltage value, for example when the voltage of the parking switch 18 does not correspond to any of the voltage value for application, the voltage value for release, and the voltage value for non-operation.

If a fault is detected in the parking switch 18 by the parking-switch fault detecting means, the parking brake controller 19 activates the electric actuator 43 (even if the ignition switch 50 is on, or the ignition is on) when the brake pedal 6 has been stepped on for predetermined time while the vehicle is at rest, so as to hold the parking brake (automatically). Whether the vehicle is at rest or not is determined with a vehicle speed sensor or a vehicle wheel sensor. Whether the brake pedal 6 is operated (stepped on) is determined with a brake pedal operation sensor (brake sensor) 6A, such as a pedal switch, a pedal stroke sensor, or a brake lamp switch, or with a hydraulic sensor for sensing the hydraulic pressure in the master cylinder 8, a displacement sensor for sensing displacement of a piston of the master cylinder 8 or displacement of an internal component of the booster 7, or the like.

Predetermined time for which the brake pedal 6 is stepped on, indicating the vehicle operator's intent to keep the vehicle at rest (presumptive condition), is a condition set for the vehicle operator to hold (apply) the parking brake in the event of a failure of the parking switch 18 (in the event of fault detection). The predetermined time set for the ignition (IGN) on may be set to be different from that for the ignition off. Specifically, the predetermined time for the ignition on (IGN_ON) may be set longer than that for the ignition off (IGN_OFF).

When the ignition is on, the predetermined time may be variably set according to a vehicle condition or the vehicle operator's operating condition. For example, when the ignition is on, the predetermined time may be set longer when the position of the shift lever (select lever, select switch), corresponding to that of the transmission, is put in a drivable condition than when it is in other condition (non-drivable condition). More specifically, the predetermined time when the shift lever is put into a driving position, such as drive (D), reverse (R), low (L), or other gear position (e.g., any of 1st to 7th position) may be set longer than that when it is put into a non-drivable position, such as parking (P) or neutral (N). Setting the predetermined time longer when the shift lever is in a drivable position (e.g., D, R, L, or any of 1st to 7th) will prevent the parking brake from being held unnecessarily, for example when the vehicle is caught in a traffic jam.

The parking brake controller 19 is so configured that if a fault is detected in the parking switch 18 by the parking-switch fault detecting means, the electric actuator 43 is actuated to hold the parking brake (automatically) upon detecting a condition that presumes the vehicle operator's exit from the vehicle while the vehicle is at rest (even if the ignition is on). The condition that presumes that the vehicle operator's exit from the vehicle (a condition that presumes the vehicle operator is exiting and/or has exited the vehicle) is set in the following manner.

Detection of at least any one of the following conditions (1) to (6) may be recognized as the vehicle operator's intent to exit the vehicle (that is, the vehicle operator is likely to exit, is exiting, or has exited the vehicle):
(1) At least any one of the doors of the vehicle is opened while the vehicle is at rest.
(2) The vehicle operator's seatbelt is taken off while the vehicle is at rest.
(3) The position of the shift lever (select lever, select switch), or position of the transmission, is selected (shifted) to parking (P) while the vehicle is at rest.
(4) The vehicle operator has removed his hands from the steering wheel (handle) for predetermined time (e.g., about one minute) while vehicle is at rest.
(5) The vehicle operator moves away from his seat while the vehicle is at rest.
(6) The vehicle operator moves to exit or has exited the vehicle while the vehicle is at rest.

The condition (1) is detected by a door sensor (not shown) for detecting opening and closing of a door. The condition (2) is detected by a seatbelt sensor (not shown) for detecting when the seat belt is bucked or unbuckled. The condition (3) is detected by a shift sensor (not shown) for detecting the gear position (selected position) of the shift lever). The condition (4) is detected by a steering sensor (not shown) for detecting whether or not the steering wheel is held. The condition (5) is detected by a seat sensor (not shown) for detecting a load on the vehicle operator's seat. The condition (6) is detected by an onboard camera (not shown) taking images of the vehicle operator. Such an onboard camera may be used to detect the condition (4) or (5). Detection of any one of the conditions (1) to (6) is recognized as the vehicle operator's intent to exit the vehicle, for example even if the ignition is on, so as to hold the parking brake (automatically).

Also, a combination of the conditions (1) to (6) may be used to presume the vehicle operator's exit from the vehicle. The parking brake may be held upon detecting a brake pedal operation or a condition that presumes the vehicle operator's exit from the vehicle while it is at rest with the ignition off. Alternatively, the parking brake may be held in the absence of any detected condition that presumes the vehicle operator's exit from the vehicle, while it is at rest with the ignition on.

The parking brake controller 19 may be so configured that if a fault is detected in the parking switch 18 by the parking-switch fault detecting means, the electric actuator 43 is actuated to hold the parking brake (automatically), upon detecting a condition that presumes the vehicle operator's intent not to drive any longer, while the drive unit of the vehicle is in a drivable condition of and the vehicle is at rest.

Here, the drivable condition of the drive unit of the vehicle means, for example, that in the case of a vehicle having an engine for driving, the ignition is on, that is, the engine for driving has started and the rotary shaft (crankshaft) is turning (at least in idling condition). In the case of a (hybrid) vehicle having an engine for driving and an electric motor for driving, the driving condition means, for example, at least either a drivable mode (ready mode or power-on mode) in which the engine has started and the rotary shaft (crankshaft) is turning or a drivable mode in which the vehicle is capable of running on the driving electric motor. For a vehicle having only a electric motor for driving, the drivable condition means, for example, a drivable mode (ready mode, power-on mode), namely, a condition in which the vehicle is capable of running on the electric motor for driving (or a condition in which the vehicle is capable of running on an electrical component/auxiliary machine equipped with an electric storage device), that is, a condition in which the vehicle's starter switch is on.

Upon detecting a condition that presumes the vehicle operator's intent not to drive any longer, with the drive unit capable of running and the vehicle at rest, e.g., upon detecting that the brake pedal has been stepped on for predetermined time or detecting any of the above conditions (1) to (6), the parking brake is held on the presumption that the vehicle operator intends not to drive. The parking brake can be held upon the presumption that the vehicle operator intends not to drive, for example when the onboard camera monitoring him detects that his line of sight has been pointing in any direction other that the forward direction for predetermined time or that his eyes have been closed for predetermined time. The control process of the parking brake controller 19 shown in FIGS. 4 and 5 will be described later in detail.

The parking brake controller 19 can receive vehicle data through the vehicle data bus 16, such as ignition (IGN) on/off data, data on vehicle speed detected by a wheel speed sensor or a vehicle speed sensor, data on operation of the brake pedal 6 (pedal effort) detected by the pedal operation sensor 6A, data on the position of the transmission (the position of the shift lever) detected by a shift sensor (select sensor, transmission sensor), data on door opening/closing detected by a door sensor, data on seatbelt buckling/unbuckling detected by a seat belt sensor, data on steering wheel hold (gripping) detected by a steering wheel sensor (handle sensor), data on occupied or unoccupied seat detected by a seat sensor, data on the vehicle operator monitored by the onboard camera, etc.

Next, the structure of disc brakes 31 having an electric parking brake function mounted on the left and right rear wheels 3 will be described with reference to FIG. 3. FIG. 3 shows only one of the left or right disc brakes 31 on the left and right rear wheels 3 as a representative example.

Each of the pair of disc brakes 31 mounted as a brake mechanism on the left and right side of the vehicle is a hydraulic disc brake having an electric parking brake function. The disc brake 31 is combined with the parking brake controller 19 to constitute a brake system (electric brake system). The disc brake 31 comprises: an mounting member 32 attached to a non-rotating portion on the vehicle's rear wheel 3 side; inner and outer brake pads 33 serving as friction members; and a caliper 34 provided with an electric actuator 43.

The disc brake 31 uses a piston 39 to propel brake pads 33 against a disc rotor 4, based on the operation of the brake pedal 6, so as to apply braking force on the wheel (rear wheel 3). The disc brake also responds to a brake command signal from the parking switch 18 or on the basis of the logic for parking brake hold determination, so as to function as a parking brake that applies braking force to the wheel (rear wheel 3) by propelling the piston 39 with the aid of the electric actuator 43 (via the rotary-to-linear motion converter 40) and thus pressing the brake pads 33 against the disc rotor 4.

The mounting member 32 extends in the direction of the axis of the disc rotor 4 (disc axial direction) to straddle the outer periphery of the disc rotor 4 and comprises: a pair of arms (not shown) spaced apart from each other along the disc circumference; a thick-walled support 32A fitted to integrally connect the proximal ends of the arms and secured to a non-rotating portion of the vehicle 4 on the inner side of the disc rotor 4; a reinforcing beam 32B located on the outer side of the disc rotor 4 to interconnect the distal ends of the arms.

The inner and outer brake pads 33, friction members, are so provided that they can be brought into contact with the opposite faces of the disc rotor 4, and are supported by the arms of the mounting member 32 so that the brake pads 33 move in the disc axial direction. The inner and outer brake pads 33 are pressed by the caliper 34 (caliper body 5 and piston 39) against the opposite faces of the disc rotor 4. In this manner, the brake pads 33 press on the disc rotor 4 rotating with the wheel (rear wheel 3) to apply braking force to the vehicle.

The mounting member 32 is provided with a caliper 34 that straddles the outer periphery of the disc rotor 4. The caliper 34 comprises the rotary-to-linear motion converter 40, the electric actuator 43, etc., in addition to the caliper body 35 supported on the arms of the mounting member 32 to move in the axial direction of the disc rotor 4, and the piston 39 slidably fitted in the caliper body 35. The caliper 34 uses the piston 39, actuated by hydraulic pressure generated upon the operation of the brake pedal 6, to propel the brake pads 33.

The caliper body 36 comprises a cylinder 36, a bridge 37, and a claw 38. The cylinder 36 is formed in a tubular bottomed shape having one axial end closed by a partition wall 36A and the other open end facing the disc rotor 4. The bridge 37 extends from the cylinder 36 in the disc axial direction to straddle the outer periphery of the disc rotor 4. The claw 38 is located on the opposite side to the cylinder 36 and extends radially inward from the bridge 37.

The cylinder 36 of the caliper body 35 is supplied with hydraulic pressure via the brake-side line 12C or 12D of FIG. 1, for example by stepping on the brake pedal 6. The cylinder 36 is formed integral with the partition wall 36A. The partition wall 36A is situated between the cylinder 36 and the electric actuator 43. The partition wall 36A has an axially extending through-hole. The partition wall 36A is provided, on the inner circumferential side thereof, with a rotatably inserted output shaft 43B of the electric actuator 43. The cylinder 36 of the caliper 35 contains the piston 39, serving as a pressing member (displacing member), and the rotary-to-linear motion converter 40.

In this embodiment, the rotary-to-linear motion converter 40 is located in the piston 39. However, the rotary-to-linear motion converter 40 is not required to be in the piston 39 so long as it is configured to propel the piston 39.

The piston 39 is open on one axial side thereof and closed by a cover 39A on the axially opposite side, facing the inner brake pad 33. The piston 39 is inserted in the cylinder 36. The rotary-to-linear motion converter 40 is located in the piston 39, which can be propelled in the axial direction of the cylinder 36 by the rotary-to-linear motion converter 40. The rotary-to-linear motion converter 40 serves as a parking mechanism that is actuated by the electrical actuator 43 to hold the wheel (rear wheel 3) non-rotatably and release it. In other words, the rotary-to-linear motion converter 40 serves as a pressing-member holding mechanism that holds the positions of the piston 39 and brake pad 33 and releases them on the basis of the actuation (rotation) of the electric actuator 43.

More specifically, the rotary-to-linear motion converter 40 uses force generated by the electrical actuator 43, namely, external force that is different from force generated by application of hydraulic pressure into the cylinder 36, to propel the piston 39 of the caliper 34 and hold the propelled piston 39 and the brake pads 33. This puts the parking brake in hold state (applying state). The rotary-to-linear motion converter 40, using the electric actuator 43, also retracts the piston 39 in the opposite direction to that of propelling it, so as to release the parking brake. Since the left and right rear wheels 3 are provided with the left and right disc brakes, the rotary-to-linear motion converter 40 and the electric actuator 43 are fitted on each of the left and right sides of the vehicle.

The rotary-to-linear motion converter 40 comprises: a threaded member 41 having a rod-shaped body with a male thread thereon, such as a trapezoidal thread; and a linearly moving member 34, which is a propelling member having a bore with a trapezoidal female thread on the inner circumferential side thereof. The threaded member 41, meshing with the inner circumferential side of the linearly moving member 42, forms a threaded mechanism that converts rotary motion of the electric actuator 43 into linear motion of the linearly moving member 42. The female thread of the linearly moving member 42 and the male thread of the threaded member 41 are threads of high irreversibility, which are trapezoidal threads in this embodiment to form the parking mechanism.

The rotary-to-linear motion converter 40 is configured to hold the linearly moving member 42 (piston 39) in any required position, utilizing friction force (retaining force), even when the electric actuator 43 is not supplied with power. It is sufficient that the rotary-to-linear motion converter 40 is capable of holding the piston 39 in the position to which it is propelled by the electric actuator 43, and ordinary threads of triangular cross section of high irreversibility or worm gears, for example, may be used instead of the trapezoidal threads.

The threaded member 41, meshing with the inner circumferential side of the linearly moving member 42, is provided with a flange 41 of large diameter on one axial end. The opposite axial end of the threaded member 41 extends toward the cover 39A of the piston 39. The threaded member 41 is integrally coupled at the flange 41A to the output shaft 43B of the electric actuator 43. The linearly moving member 42 comprises an engaging projection 42A on the outer circumferential side thereof, the engaging projection 42A permitting axial relative movement of the linearly moving member 42 while preventing it from rotating relative to piston 39 (while restricting relative rotation).

The electric actuator 43, which is an electric motor (electrically powered mechanism, parking brake actuator), is located inside a casing 43A. The casing 43A is located in a position on the outside of the partition wall 36A and secured to the cylinder 36 of the caliper body 35. The electric actuator 43 actuates (holds/releases) the disc brake 31 in response to the above-described actuation command signal (actuation command signal for hold, actuation command signal for release). The electric actuator 43 comprises a motor containing a stator, a rotor, etc. (not shown); and a speed reducer for increasing the torque of the motor (not shown). The speed reducer has an output shaft 43B for outputting rotary torque after it is increased. The output shaft 43B extends axially through the partition wall 36A of the cylinder 36 and is connected in the cylinder 36 to an end of the flange 41A of the threaded member 41, so as to rotate with the threaded member 41.

The output shaft 43B and the threaded member 41 may be interconnected, for example by means that allows axial movement and prevents rotation. Such means is, for example, known spline fit or polygonal columnar (noncircular) fit. The speed reducer may be, for example, a planetary gear reducer or a worm gear reducer. A known non-reversing (irreversible) speed reducer, such as a worm gear reducer, a known reversible mechanism, such as a ball screw or a ball ramp mechanism, may be used as the rotary-to-linear motion converter 40. In this case, a reversible rotary-to-linear motion converter and an irreversible speed reducer, for example, may be used to form a parking mechanism.

When the parking switch 18 of FIGS. 1 to 3 is operated by the vehicle operator, the electric actuator 43 (its motor) is energized via the parking brake controller 19 to rotate the output shaft 43B of the electric actuator 43. This causes the threaded member 41 of the rotary-to-linear motion converter 40 to rotate in one direction with the output shaft 43B and thus propel (drive) the piston 39 via the linearly moving member 42 toward the disc rotor 4. This in turn puts the disk brake 31 into a hold (applying) state, namely, a state of acting as an electric parking brake to apply braking force by clamping the disc rotor 4 between the inner and outer brake pads 33.

When the parking switch 18 is operated for brake release, the electric actuator 43 rotates the screw member 41 of the rotary-to-linear motion converter 40 in the other (opposite) direction. This causes the linearly moving member (and the piston 39 if hydraulic pressure is not applied) to move away from the disc rotor 4, thereby putting the disc brake 31 into a release state, namely, a state in which braking force for parking is released.

In this case, in the rotary-to-linear motion converter 40, the threaded member 41 rotates relative to the linearly moving member 42, while rotation of the linear member 42 in the piston 39 is prevented, so that the linearly moving member 42 undergoes relative linear motion in accordance with the rotational angle of the threaded member 41. In this manner, the rotary-to-linear motion converter 40 converts rotary motion into linear motion to propel the piston 39 with the aid of the linearly moving member 42. The rotary-to-linear motion converter 40 also holds the linearly moving member 42 in a required position, utilizing friction force between it and the threaded member 41, to hold the piston 39 and brake pad 33 in the position where they are propelled by the electric actuator 43.

The partition wall 36A of the cylinder 36 and the flange 41A of the threaded member 41 are provided therebetween with a thrust bearing 44. The thrust bearing 41, with the partition wall 36A, receives a thrust load from the threaded member 41, making smooth the rotation of the threaded member 41 relative to the partition wall 36A. Between the partition wall 36A of the cylinder 36 and the output shaft 43B of the electric actuator 43 is provided a seal member 45, which serves as a seal between the cylinder 36 and the electric actuator 43 to prevent brake fluid from leaking from the cylinder 36 into the actuator 43.

The cylinder 36 is provided, on its open side, with: a piston seal 46 serving as an elastic seal between the cylinder 36 and the piston 39; and a dust boot 47 for preventing ingress of foreign substances into the cylinder 36. The dust boot 47 is a flexible bellows-like seal member located between the open end of the cylinder 36 and the outer circumference of the cover 39A of the piston 39.

The disc brakes 5 on the front wheels 2 are substantially the same in construction as the disc brakes 31 on the rear wheels 3, except for their parking brake mechanism. The disc brakes 5 on the front wheels 2 do not have a rotary-to-linear motion converter 40, an electric actuator 43, etc., serving as a parking brake, which the disc brakes 31 on the rear wheels 3 have. Instead of the disk brakes 5, the front wheels 2 may be provided with a disc brake 31 having an electric parking brake function.

This embodiment has been described by way of example in terms of the hydraulic disc brake 31 with the electric actuator 43. This embodiment, however, is not limited to this example, and any brake mechanism with a parking mechanism that holds pressing force by pressing (propelling) a friction member (pad, shoe) against a rotating member (disc rotor, drum) upon the actuation of an electric actuator (electric motor) may be used instead, such as an electric disc brake having an electric caliper, an electric drum brake using an electric actuator to press a shoe on a drum for braking force application, a disc brake having a parking brake of electric drum type, or a mechanism using an electrical actuator to pull a cable to hold a parking brake.

The brake wheel for a four-wheeled vehicle according to this embodiment so structured operates in the following manner.

When the brake pedal 6 is stepped on by the vehicle operator, the stepping force is transmitted via the booster 7 to the master cylinder 8, which generates hydraulic brake pressure. The hydraulic pressure in the master cylinder 8 is transmitted through the cylinder-side hydraulic lines 10A, 10B and the ESC 11 and the brake-side lines 12A 12B, 12C, and 12D and distributed to the disc brakes 5 and 31 to apply braking force to the left and right front wheels 2 and the left and right rear wheels 3.

First referring to the disc brakes 31 on the rear wheels 3, the cylinder 36 of each caliper 34 is supplied via the brake-side lines 12C and 12D with hydraulic pressure, which in turn displaces the piston 39 slidingly toward the inner brake pad 33 as the hydraulic pressure in the cylinder 36 rises. This causes the piston 39 to press the inner brake pad 33 against one side of the disc rotor 4. This action is reacted by force that displaces the caliper 34 as a whole slidingly inward relative to the arms of the mounting member 32.

As a result, an outer leg (claw 38) of the caliper 34 acts to press the outer brake pad 33 against the disc rotor 4, such that the disc rotor 4 is clamped on its axially opposite sides by the pair of brake pads 33. This generates hydraulic braking force. Release of the braking force stops the supply of hydraulic pressure into the cylinder 36, displacing the piston 39 back into the cylinder 36. This sets the inner and outer brake parts 33 apart from the disc rotor 4 to put the vehicle back into non-braking mode.

Subsequently, when the parking switch 18 is activated for braking (turned on) by the vehicle operator, the electric actuator 43 of the disc brake 31 is energized by the parking brake controller 19 to rotate the output shaft 43B of the electric actuator 43. The disc brake 31 having an electric parking brake function converts rotary motion of the electric actuator 43 into linear motion of the linearly moving member 42 via the threaded member 41 of the rotary-to-linear motion converter 40, axially moving the threaded member 42 to propel the piston 39. This forces the pair of brake pads 33 against the opposite faces of the disc rotor 4.

At this stage, the linearly moving member 42 is held in braking mode by friction force (retaining force) between the linearly moving member 42 and the threaded member 41 arising from pressing reaction force, or normal force, transmitted from the piston 39, thereby actuating (applying) the disc brake 31 on the rear wheel 3 to serve as a parking brake. This means that even after the supply of electric current to the electric actuator 43 is stopped, the female thread of the linearly moving member 42 and the male thread of the threaded member 41 keep the linearly moving member 42 (and hence the piston 39) in braking position.

When the parking switch 18 is operated for brake release (turned off) by the vehicle operator, the electric actuator 43 is energized by the parking brake controller 19 to turn the motor in the reverse direction, such that the output shaft 43B of the electric actuator 43 is turned in the opposite direction to that when the parking brake is actuated (applied). This releases the braking force that has been maintained by the threaded member 41 and the linearly moving member 42, and causes the rotary-to-linear motion converter 40 to move the linearly moving member 42 in its return direction into the cylinder 36 by a distance corresponding to the amount of reverse rotation of the electric actuator 43, so as to release the braking force of the parking brake (disc brake 31).

If the parking brake could not be held (applied) in the event of a failure of the parking switch 18, inconvenience would ensue. A conceivable measure to address this inconvenience would be to automatically hold the parking brake in the event of a failure of the parking switch 18 only if the ignition is off. This, however, would leave the vehicle operator with no choice but to turn off the ignition to hold the parking brake if he has to get out of the vehicle, leaving other occupants in the vehicle. Turning off the ignition makes the (onboard) air conditioner inoperative, which might give the occupants great discomfort, for example in extremely hot or cold weather.

To address this problem, the parking brake controller 19 of this embodiment is configured to activate the electric actuator 43 to hold the parking brake, upon detecting a failure (fault) of the parking switch 18, if the parking brake controller 19 detects a condition that presumes that the vehicle operator does not intend to drive the vehicle any longer while it is at rest.

The control process implemented by the operational circuit 20 of the parking brake controller 19 (process of automatically holding the parking brake in the event of a fault in the parking switch 18) will now be described with reference to FIGS. 4 and 5. The process of FIGS. 4 and 5 is repeated at a predetermined frequency, or at predetermined intervals (of, for example, 10 ms), while the parking brake controller 19 is being energized.

The supply of electric current to the parking brake controller 19 is initiated by system activation (vehicle system activation, activation of the parking brake controller 19), for example by turning on accessory (ACC mode), the ignition (ready mode), a power source (ON mode), or the like when the vehicle operator turns on a power switch, a key switch, or the like (ignition switch 50).

The termination (shutting off) of supply of electric current to the parking brake controller 19 is effected, not immediately after the vehicle operator turns the ignition off (turn the power off, lock) by operating the power switch, key switch, or the like, but when a certain length of time (predetermined time: for example, about 5 minutes) has elapsed since the vehicle operator turns the ignition off. The reason for providing this certain length of time before termination is to enable the vehicle operator's operation of holding the parking brake and the operation of holding the parking brake automatically through the process of FIGS. 4 and 5 even after the ignition is turned off (power off, lock) by the vehicle operator's operation of the power switch, key switch, or the like.

Upon starting the process of FIG. 4 by current supply to the parking brake controller 19, the operational circuit 20 determines in S1 whether the parking switch 18 is failing (faulty or not). This determination is based, for example, on a voltage value of the parking switch 19. More specifically, a failure (fault) of the parking switch 18 so determined may be, for example, when the voltage value of the parking brake 18 deviates from both of the voltage values for brake application operation and for release operation and the voltage value in the absence of brake operation.

If "YES" in S1, that is, if it is determined that the parking switch 18 is failing (faulty), the process proceeds to S2. S2 determines whether the vehicle is at rest or not. This determination may be based on vehicle speed. The vehicle is determined to be at rest, for example when it has slowed down and been moving at less than 4 km/h for predetermined time (e.g., 30 ms). The vehicle is determined to be running when the vehicle has accelerated from stop and been moving at 5 km/h or greater for predetermined time (e.g., 30 ms). The vehicle speed may be determined, for example from the speed (wheel speed) of the wheels 2 and 3 obtained through the vehicle data bus 16. Instead of the wheel speed, other vehicle speed information may be used, for example, vehicle speed determined from the rotational speed of the rotating shaft of the vehicle transmission.

If "YES" in S2, that is, if the vehicle is determined to be at rest, the process proceeds to S3. S3 determines whether operation of starting to move the vehicle is being carried out by the vehicle operator. This determination may be based, for example, on whether the vehicle operator is stepping on the accelerator pedal or has put the shift lever (select lever, select switch) into a driving position (D, R, L, any of 1st to 7th, or the like). Such information on accelerator pedal operation or the position of the shift level (selected position) can be obtained, for example, through the vehicle data bus 16.

If "NO" in S3, that is, if it is determined that there is no starting operation by the vehicle operator, the process proceeds to S4. S4 determines whether the ignition (IGN) is switched. In other words, it is determined whether the mode of the ignition (IGN) in this ongoing control cycle differs from that in the control cycle immediately before this one, or more specifically, whether the control cycle immediately before this one is ignition ON (IGN_ON) and this ongoing control cycle is control OFF (IGN_OFF) or whether the control cycle immediately before this one is ignition OFF (IGN_OFF) and this control cycle is ignition ON (IGN_ON). Such ignition ON/OFF information can be obtained, for example through the vehicle data bus 16.

If "NO" in S4, that is, if it is determined that the ignition (IGN) is not switched, the process proceeds to S7 without going through S5 and S6. If "YES" in S4, that is, if it is determined that the ignition (IGN) is switched, the process proceeds to S5 and S6. S5 sets (resets) "a counter for brake pedal stepping operation," which shows a condition that presumes the vehicle operator's intent not to drive any longer, to zero. S6 sets (resets) "an exit or non-driving state counter," which shows another condition that presumes the vehicle operator's intent not to drive any longer, to zero.

S7, following S4 or S6, determines whether brake pedal stepping is taking place (whether the brake pedal 6 is being stepped). Such operation of the brake pedal 6 can be obtained from the brake pedal operation sensor 6A (through the vehicle data bus 16).

If "YES" in S7, that is, if it is determined that brake pedal stepping is taking place, the process proceeds to S8 to add one to a "counter for brake pedal stepping operation" value (or to move the count one up). If "NO" in S7, that is, if it is determined that brake pedal stepping is not taking place, the process proceeds to S9 to set (reset) the "counter for brake pedal stepping operation" value to zero.

S10, following S8 or S9, determines whether there is detected a condition that presumes the vehicle operator's exit from the vehicle or non-driving state. The vehicle operator's intent to exit the vehicle (which means that the driver is about to exit the vehicle and/or has exited the vehicle), indicating a condition that presumes the vehicle operator's exit from the vehicle, may be recognized, for example, upon detection of any of the following conditions: when at least any one vehicle door is opened, when a seatbelt is taken off; when the shift lever is shifted into parking (P); when the vehicle operator's hands been removed from the steering wheel (handle) for predetermined time; when the vehicle operator moves away from his seat; when the vehicle operator moves to exit the vehicle; when the vehicle operator has exited the vehicle, and the like.

The vehicle operator's intent not to drive, indicating a condition that presumes the vehicle operator's non-driving state, may be recognized, for example, upon detecting a condition similar to those for the vehicle operator's intent to exit the vehicle. The vehicle operator's intent not to drive may also be recognized, for example, when the onboard camera, monitoring the vehicle operator, detects that the vehicle operator's line of sight has been shifted from the forward direction for predetermined time or when the vehicle operator's eyes have been closed for predetermined time. Information (condition) that presumes the vehicle operator's intent to exit the vehicle or his intent not to drive can be obtained, for example, through the vehicle data bus 16.

If "YES" in S10, that is, if it is determined that there is detected a condition that presumes the vehicle operator's exit from the vehicle or non-driving state, the process proceeds to S11 to add one to the "exit or non-driving state counter" value (or to move the count one up). If "NO" in S10, that is, if it is determined that there is not detected a condition that presumes the vehicle operator's exit from the vehicle or non-driving state, the process proceeds to S12 to set (reset) the "exit or non-driving state counter" to zero.

If "NO" in S1, that is, if it is determined that the parking switch 18 is not failing (not faulty), if "NO" in S2, that is, if it is determined that the vehicle is not at rest (or is running), or if "YES" in S3, that is, if it is determined that operation of starting to move the vehicle is carried out by the vehicle operator, the process proceeds to S13 and S14. S13 sets (resets) the "counter for brake pedal operation" value to zero, and next S14 sets (resets) the "exit or non-driving state counter" value to zero.

S15, following S11, S12, or S14, determines whether the ignition is on (IGN_ON). Such ignition on/off information can be obtained, for example, through the vehicle data bus 16. If "YES" in S15, that is, if it is determined that the ignition is on, the process proceeds to S16 to determine whether the "counter for brake pedal stepping operation" is greater than a "threshold for brake pedal stepping operation counter when the ignition is on."

The "threshold for brake pedal stepping operation counter when the ignition is on" corresponds to predetermined time, while the ignition is on, from the instant at which the brake pedal 6 is stepped on to the instant at which operation of holding the parking brake is automatically initiated. The "threshold for brake pedal stepping operation counter when the ignition is on" is preset to a suitable value, for example by experiment, calculation, or simulation to hold the parking brake, when necessary (when desired by the vehicle operator or a passenger), with the ignition on.

The "threshold for brake pedal stepping operation counter when the ignition is on" may be set higher than a "threshold for brake pedal stepping operation counter when the ignition is off" used in S18 (described later). This makes it possible to set longer the predetermined time for which the brake pedal 6 is stepped on until the automatic start of parking brake hold operation when the ignition is on than when it is off.

The "threshold for brake pedal stepping operation counter when the ignition is on" may be set to vary depending on vehicle conditions or the vehicle operator's operating conditions. For example, the threshold when the shift lever is set to a driving position (D, R, L, any of the first to seventh speed, or the like) may be set higher than that when the shift lever is in a non-driving position (P, N).

If "YES" in S16, that is, if it is determined that the "brake pedal stepping operation counter" is greater than or equal to the "threshold for brake pedal stepping operation counter when the ignition is on," the process proceeds to S20 to output an automatic application command. In other words, on the basis of a command from the parking brake controller 19, the electric actuator 43 is rotated for braking operation to hold the parking brake.

If "NO" in S16, that is, if it is determined that the "brake pedal stepping operation counter" is not greater than or equal to the "threshold for brake pedal stepping operation counter when the ignition is on," the process proceeds to S17. S17 determines whether the "exit or non-driving state counter" is greater than or equal to a "threshold for exit or non-driving state counter when the ignition is on."

The "threshold for exit or non-driving state counter when the ignition is on" corresponds to predetermined time from the instant of detecting a condition that presumes the vehicle operator's exit or non-driving state to the instant of automatically initiating parking brake hold operation. The "threshold for exit or non-driving state counter when the ignition is on" is also preset to a suitable value, for example by experiment, calculation, or simulation to hold the parking brake, when necessary (when desired by the vehicle operator or a passenger), with the ignition on.

If "YES" in S17, that is, if it is determined that the "exit or non-driving state counter" is greater than or equal to the "threshold for exit or non-driving state counter when the ignition is on," the process proceeds to S20 to output an automatic application command. In other words, on the basis of a command from the parking brake controller 19, the electric actuator 43 is rotated for holding the parking brake.

If "NO" in S17, that is, if it is determined that the "exit or non-driving state counter" is not greater than or equal to the "threshold for exit or non-driving state counter when the ignition is on," the process proceeds to RETURN, without going through S2, to repeat the process starting from S1 below START.

If "NO" in S15, that is, if it is determined that the ignition is not on, the process proceeds to S18 to determine whether the "brake pedal stepping operation counter" is greater than or equal to a "threshold for brake pedal stepping operation counter when the ignition is off."

The "threshold for brake pedal stepping operation counter when the ignition is off" corresponds to predetermined time from the instant of stepping on the brake pedal 6 to the instant of automatically initiating parking brake hold operation while the ignition is off. The "threshold for brake pedal stepping operation counter when the ignition is off" is also preset to a suitable value, for example by experiment, calculation, or simulation to hold the parking brake, when necessary (when desired by the vehicle operator or a passenger), with the ignition off.

If "YES" in S18, that is, if it is determined that the "brake pedal stepping operation counter" is greater than or equal the "threshold for brake pedal stepping operation counter when the ignition is off," the process proceeds to S20 to output an automatic application command. In other words, on the basis of a command from the parking brake controller 19, the electric actuator 43 is rotated to hold the parking brake.

If "NO" in S18, that is, if it is determined that the "brake pedal stepping operation counter" is not greater than or equal the "threshold for brake pedal stepping operation counter when the ignition is off," the process proceeds to S19 to determined whether the "exit or non-driving state counter" is greater than or equal to a "threshold for exit or non-driving state counter when the ignition is off."

The "threshold for exit or non-driving state counter when the ignition is off" corresponds to predetermined time from the instant of detecting a condition that presumes the vehicle operator's exit from the vehicle or non-driving state to the instant of automatically initiating parking brake hold operation while the ignition is off. The threshold for exit or non-driving state counter when the ignition is off" is also preset to a suitable value, for example by experiment, calculation, or simulation to hold the parking brake, when necessary (when desired by the vehicle operator or a passenger), with the ignition off.

If "YES" in S19, that is, if it is determined that the "exit or non-driving state counter" is greater than or equal the "threshold for exit or non-driving state counter when the ignition is off," the process proceeds to S20 to output an automatic application command. In other words, on the basis of a command from the parking brake controller 19, the electric actuator 43 is rotated to hold the parking brake.

If "NO" in S19, that is, if it is determined that the "exit or non-driving state counter" is not greater than or equal the "threshold for exit or non-driving state counter when the ignition is off," the process proceeds to RETURN, without going through S20, to repeat the process staring from S1 below START.

This embodiment enables the parking brake to be held to keep the vehicle stationary in the event of a failure of the parking switch 18.

More specifically, this embodiment makes it possible in the event of a failure of the parking switch 18 (in the event of detection of a fault) to activate the electric actuator 43 to hold the parking brake when the brake pedal has been stepped on for predetermined time while the vehicle is at rest or upon detecting a condition that presumes the vehicle operator's exit from the vehicle or non-driving state while the vehicle is at rest. This enables the parking brake to be held to keep the vehicle stationary in the event of a failure of the parking switch 18.

This embodiment makes it possible in the event of a failure of the parking switch 18 (in the event of detection of a fault) to activate the electric actuator 43 for braking operation, to hold the parking brake upon detecting a condition that presumes the vehicle operator's intent not to drive any longer (a condition that the brake pedal 6 has been stepped on for predetermined time or a condition that presumes the vehicle operator's exit from the vehicle or non-driving state) while vehicle is at rest with the engine, a drive unit, capable of running (with the ignition on). This parking brake hold operation can be carried out when the drive unit is capable of running (when the ignition is on) in the event of a failure of the parking switch 18. As such, the vehicle can be kept stationary, for example while the onboard air conditioner is running, preventing discomfort which would otherwise be experienced by passengers in extremely hot or cold weather in the event of a failure of the parking switch 18.

In this embodiment, the parking brake controller 19 sets longer predetermined time for the state in which the ignition is on than that for the state in which it is off. This avoids unnecessarily holding the parking brake when the ignition is on.

In this embodiment, the parking brake controller 19 sets longer predetermined time for the state in which the selected position of the shift lever, or the position of the transmission, is a drivable position (D, R, L, any of the first to seventh speed, or the like) with the ignition on than that for the state in which it is a non-drivable position (non-driving position: P, N). This avoids unnecessarily holding the parking brake when the vehicle intermittently runs at short intervals, for example when the vehicle is caught in a traffic jam.

In this embodiment, one of the conditions that presume the vehicle operator's exit from the vehicle is that at least any one vehicle door is opened. Under this condition, the parking brake is held when at least any one vehicle door is opened while the vehicle is at rest. This makes it possible to hold the parking brake, when necessary (when desired by the vehicle operator or a passenger), in the event of a failure of the parking switch 18.

In this embodiment, one of the conditions that presume the vehicle operator's exit from the vehicle is that the vehicle operator's seatbelt is taken off while the vehicle is at rest is Under this condition, the parking brake is held when the vehicle operator's seatbelt is taken off while the vehicle is at rest. This makes it possible to hold the parking brake, when necessary (when desired by the vehicle operator or a passenger), in the event of a failure of the parking switch 18.

In the above embodiment, one of the conditions that presume the vehicle operator's exit from the vehicle is that the position of the shift lever, or the position of the transmission, is shifted to parking (P). Under this condition, the parking brake is held when the transmission is shifted to parking position (P) while the vehicle is at rest. This makes it possible to hold the parking brake, when necessary (when desired by the vehicle operator or a passenger), in the event of a failure of the parking switch 18.

In the above embodiment, S1 in FIG. 4 represents an example of parking-switch fault detecting means, which is an essential element of the present invention.

In the above embodiment, if S4 determines that the ignition (IGN) is switched (YES), S5 sets (resets) the "brake pedal step operation counter" to zero, and S6 sets (resets) the "exit or non-driving state counter" to zero. This embodiment represents a non-limiting example and may be modified, for example, to proceed to S7 if "NO" in S3, bypassing S4, S5, and S6.

The above embodiment is an example in which if "NO" in S15, that is, if it is determined that the ignition is not on and if it is determined in S18 or S19 that the "brake pedal stepping operation counter" or "exit or non-driving state counter" is greater than or equal to the respective threshold value (YES), the process proceeds to S20 to hold the parking brake.

In other words, if it is determined that the ignition is not on, the parking brake is held, provided that the "brake pedal stepping operation counter" or "exit or non-driving state counter" be greater than or equal to the respective threshold value. The present invention is not limited to this embodiment. Instead, for example, the process may be modified to proceed to S20 if "NO" in S15, without going through S18 and S19. That is, if it is determined that the ignition is not on, the parking brake is held when the drive unit, such as an engine, is in a non-drivable state, e.g., when the ignition is off or in accessory position.

Figure 7:
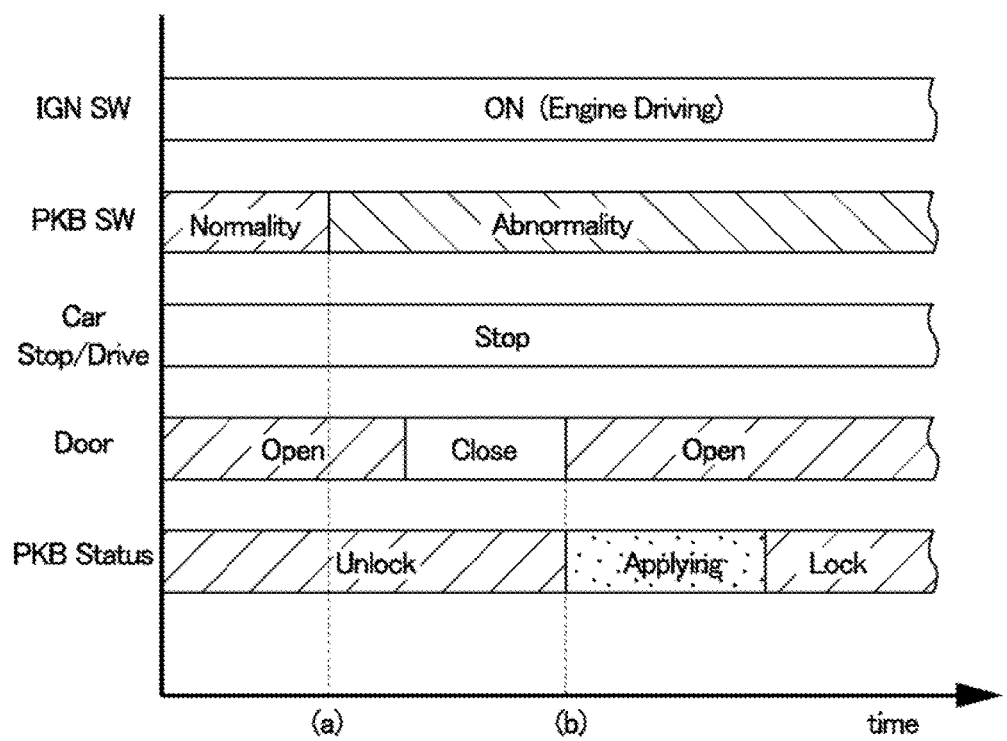
FIG. 7 is a time chart showing the relationship between door open/closed state and parking brake hold.

FIGS. 6 and 7 show a second embodiment. One characteristic feature of this embodiment is that if a fault is detected in the parking switch while a vehicle door is open, the vehicle operator's exit from the vehicle is presumed when that door is closed and reopened. Below, descriptions of the same elements as those of the first embodiment are omitted by assigning the same reference numerals to them.

In the first embodiment, if a fault is found in the parking switch 18 by the parking-switch fault detecting means, the electric actuator 43 is activated to hold the parking brake (automatically) when a vehicle door (e.g., the vehicle operator's door) is open while the vehicle is at rest, even if the ignition is on (that is, regardless of whether the ignition is on or not). As such, for example at the instant of detecting a fault in the parking switch 18 while a vehicle door is open, the electric actuator 43 is activated to hold the parking brake. This, however, might give, for example, discomfort to the vehicle operator who left the ignition on, since the parking brake is held upon the fault detection without giving the vehicle operator a prior warning.

In the second embodiment, if a fault is detected in the parking switch 18 when at least one of the doors of the vehicle (e.g., the vehicle operator's door) is opened, the parking brake controller 19 activates the electric actuator 43 to hold the parking brake (automatically) on condition that the opened door(s) are closed and reopened. The condition "the opened door(s) are closed and reopened" may be used as a condition that presumes the vehicle operator's exit from the vehicle, whether the ignition is on or off. This condition, however, is preferably used as a condition that presumes the vehicle operator's exit from the vehicle when the ignition is on.

Under this condition, if a fault is found in the parking switch 18 when any door is open with the ignition on, the electric actuator 43 is activated to hold the parking brake upon closing and reopening that door. On the other hand, when the ignition is off, the electric actuator 43 is activated to hold the parking brake on condition that any of the vehicle doors is opened, if a fault is detected in the parking switch 18.

For such control, the second embodiment carries out the process shown in FIG. 6 in place of S10 of FIG. 4, namely, a process of determining whether there is detected a condition that presumes the vehicle operator's exit from the vehicle or non-driving state. This means that upon reaching S10 of FIG. 4 after S8 or S9, the process of FIG. 6 starts. S21 determines whether the parking switch 18 is failing or not (faulty or not). This determination is similar to S1 of FIG. 4. If "NO" in S21, that is, if it is determined that the parking switch 18 is not failing, the process proceeds to S22, which determines that there is no exit or non-driving state and terminates the process. In this case, the process may proceed to detect other conditions that presume the vehicle operator's exit from the vehicle or non-driving state (the conditions (2) to (6) described earlier in Paragraph 0041). If a step of detecting other conditions has been carried out, the process of FIG. 6 may proceed, via RETURN, to S12 of FIG. 4.

If "YES" in S21 of FIG. 6, that is, if it is determined that the parking switch 18 is failing, the process proceeds to S23. S23 determines whether any vehicle door (e.g., the vehicle operator's door) is open in this ongoing control process. This determination may be based, for example, on door opening/closing information derived through the vehicle data bus 16 from a door sensor. If "NO" in S23, that is, if it is determined that no vehicle door is open in this control process, it proceeds to S22. If "YES" in S23, that is, if it is determined in this control process that a door(s) are open, it proceeds to S24.

S24 determines whether the ignition is on (IGN_ON). This determination is similar to S15 of FIG. 5. If "YES" in S24 of FIG. 6, that is, if it is determined that the ignition is on, the process proceeds to S25. If "NO" in S24, that is, if it is determined that the ignition is off, the process proceeds to S26, without going through S25. S25 determines whether the doors of the vehicle were closed during the previous control process. This determination may be based, for example, on door opening/closing information stored in a memory 21 during the previous control process.

If "NO" in S25, that is, if it is determined that the vehicle doors are not closed during the previous control process, the ongoing process proceeds to S25. If "YES" in S25, that is, it is determined that the doors of the vehicle were closed during the previous control process, the ongoing process proceeds to S22, which determines that the vehicle is not in exit or non-driving state and terminates the process. In this case, after going through RETERN of FIG. 6, the process of FIG. 4 proceeds to S11.

FIG. 7 is a time chart showing the relationship between door opening/closing and hold of the parking brake. As shown in FIG. 7, when the ignition is on and a door is open, S25 determines "NO," even if a fault is detected in the parking switch 18 at the instant (a) of FIG. 7. As such, at the instant (a), the parking brake is not brought into hold mode. After a fault is detected in the parking switch 18, S25 of FIG. 6 determines "YES" if the door that has so far been closed is opened at the instant (b) of FIG. 7. In this case, at the instant (b) of FIG. 7, the parking brake is brought into hold (applying) mode and subsequently into lock mode in which the parking brake is fully held.

As described above, the second embodiment uses the process of FIG. 6 to make a determination as to exit or non-driving state. The basic operation of this embodiment does not substantial differ from that of the first embodiment.

A notable feature of the second embodiment is that if a fault is found in the parking switch 18 when the ignition is on and any vehicle door (e.g., the vehicle operator's door) is open, S21 to S25 of FIG. 6 determine that the vehicle is in exit or non-driving state when that open door is closed and reopened. Upon this determination, S20 activates the electric actuator 43 to hold the parking brake. This prevents discomfort that would otherwise be experienced by the vehicle operator, who left the ignition off, that is, discomfort arising from holding the parking brake upon fault detection without a prior warning.

On the other hand, the state in which the ignition is off and a door is open can be determined as the absence of the vehicle operator's intent to start moving the vehicle. In this case, the process proceeds to S23 and S24 and then to S26, bypassing S25. The state in which a door is open when the ignition is off is determined in S26 as an exit or non-driving state. Upon this determination, S20 activates the electric actuator 43 to hold the parking brake. This leads to rapid actuation of the parking brake when the ignition is off, provided that a door be open.

The above embodiments are described as a non-limiting example in terms of the disc brakes 31 having an electric parking brake function fitted to left and right rear wheels. Alternatively, such disc brakes having an electric parking brake function may be fitted, for example, to all wheels (four wheels).

The above embodiments are described as a non-limiting example in terms of hydraulic disc brakes 31 having an electric parking brake. Such hydraulic disc brakes may be replaced with electric disc brakes, which do not require supply of hydraulic pressure. Instead of the disc brake mechanism, a drum brake mechanism, for example, may be used. Various types of parking mechanism for a parking system and brake mechanism may be used, such as, a drum-in-disc brake, which combines a disc brake with an electric parking brake of drum type, and a mechanism that holds a parking brake by pulling a cable with the aid of an electric motor.

The above embodiments make it possible to hold the parking brake to keep the vehicle stationary in the event of a failure of the parking switch.

The embodiments make it possible to actuate the electric motor in the event of a parking switch failure (a fault detected) to hold the parking mechanism so as to hold a parking brake when the brake pedal has been stepped on for predetermined time while vehicle is at rest or upon detecting a condition that presumes the vehicle operator's exit from the vehicle while the vehicle is at rest, whether the starter switch of the vehicle is on or off. This enables the parking brake to be held in the event of a parking switch failure to hold the vehicle stationary.

The embodiments make it possible to hold the parking brake with a parking mechanism in the event of a parking switch failure (a fault detected) by actuating an electric motor upon detecting a condition that presumes the vehicle operator's intent not to drive any longer while the vehicle's drive is in drivable mode but the vehicle is at rest. This enables the parking brake to be held, with the drive unit in drivable mode, in the event of a parking switch failure. This is particularly convenient in cold and hot regions, since the vehicle can be kept stationary, for example with the onboard air conditioner running.

In the embodiments, control means sets longer predetermined time for the state in which the ignition is on than that for the state in which it is off. This prevents unnecessary parking brake hold when the ignition is on.

In the embodiments, the control means sets longer predetermined time for the state in which the ignition is on with the transmission in drivable mode than that for the state in which the transmission is in non-drivable mode. This prevents unnecessary parking brake hold when the vehicle is running intermittently at short intervals, for example when it is caught in a traffic jam.

In the embodiments, one of the conditions that presume the vehicle operator's exit from the vehicle is that at least any one of the doors of a vehicle is opened. This enables the parking brake to be held when any one vehicle door is opened while the vehicle is at rest. In this way, the parking brake can be held when necessary (when desired by the vehicle operator or a passenger) in the event of a parking switch failure.

In the embodiments, if a fault is detected in the parking swatch while at least one of the doors of the vehicle is open, a condition that presumes the vehicle operator's exit from the vehicle is that that open door(s) are closed and reopened. Preferably, if a parking switch fault is detected while the vehicle's starter switch is on and at least any one of the doors of the vehicle is open, a condition that presumes the vehicle operator's exit from the vehicle is that that open door(s) are closed and reopened. This ensures more accurate determination of the vehicle operator's intent to exit the vehicle on the basis of door opening/closing operation. This also prevents discomfort that would otherwise be caused by holding the parking brake without a prior warning when a door is open.

In the embodiments, one of the conditions that presume the vehicle operator's exit from the vehicle is to that the vehicle operator's seatbelt is taken off while the vehicle is at rest. This enables the parking brake to be held when the vehicle operator's seat belt is taken off while the vehicle is at rest. In this way, the parking brake can be held when necessary (when desired by the vehicle operator or a passenger) in the event of a parking switch failure.

In the embodiments, one of the conditions that presume the vehicle operator's exit from the vehicle is that the transmission is shifted into parking position. This enables the parking brake to be held when the transmission is shifted into parking position while the vehicle is at rest. In this way, the parking brake can be held when necessary (when desired by the vehicle operator or a passenger) in the event of a parking switch failure.

REFERENCE SIGNS LIST

2. front wheel (wheel)
3. rear wheel (wheel)
4. disc rotor (rotating member)
6. brake pedal
18. parking switch
19. parking brake controller (control means)
31. disc brake (brake mechanism)
33. brake pad (friction member)
39. piston (pressing member)
40. rotary-to-linear motion converting mechanism (parking mechanism)
43. electric actuator (electric motor)

The invention claimed is:

1. A brake system comprising:
   a brake mechanism configured to propel a friction member by use of a pressing member on the basis of operation of a brake pedal, the friction member being disposed to come into contact with a rotating member rotating with a wheel of a vehicle;

a parking mechanism operated with an electric motor to hold the wheel non-rotatably and release it; and a controller configured to actuate the electric motor in accordance with operation of a parking switch configured to hold and release the parking mechanism, the controller being further configured to detect any fault in the parking switch and obtain a state of the vehicle's starter switch, wherein if a fault is detected in the parking switch by the controller and if a state that the vehicle's starter switch is on is obtained by the controller, the electric motor is actuated to hold the parking mechanism upon detecting a condition that presumes that the vehicle operator intends not to drive any longer while the vehicle's drive unit is in drivable mode and the vehicle is at rest.

2. A brake system according to claim 1, wherein if a fault is detected in the parking switch by the controller and if a state that the vehicle's starter switch is off is obtained by the controller, the condition that presumes that the vehicle operator intends not to drive any longer is that at least any one of a plurality of doors of the vehicle is open.

3. A brake system according to claim 2, wherein the condition that presumes that the vehicle operator intends not to drive any longer further includes that the vehicle operator's seatbelt is taken off while the vehicle is at rest.

4. A brake system according to claim 3, wherein the condition that presumes that the vehicle operator intends not to drive any longer further includes that the transmission is shifted to parking position.

5. A brake system according to claim 3, wherein the condition that presumes that the vehicle operator intends not to drive any longer further includes that the transmission is shifted to parking position.

6. A brake system according to claim 1, wherein if a fault is detected in the parking switch while at least one of the plurality of doors of the vehicle is open, the condition that presumes that the vehicle operator intends not to drive any longer is that that the at least one open door is closed and reopened.

7. A brake system according to claim 6, wherein the condition that presumes that the vehicle operator intends not to drive any longer further includes that the vehicle operator's seatbelt is taken off while the vehicle is at rest.

8. A brake system according to claim 1, wherein the condition that presumes that the vehicle operator intends not to drive any longer is that the vehicle operator's seatbelt is taken off while the vehicle is at rest.

9. A brake system according to claim 1, wherein the condition that presumes that the vehicle operator intends not to drive any longer is that the transmission is shifted to parking position.

10. A brake system comprising:
a brake mechanism configured to propel a friction member by use of a pressing member, based on operation of a brake pedal, the friction member being disposed to come into contact with a rotating member rotating with a wheel of a vehicle;

a parking mechanism operated with an electric motor to hold the wheel non-rotatably and release it; and a controller configured to actuate the electric motor, in accordance with operation of a parking switch configured to hold and release the parking mechanism, the controller being further configured to detect any fault in the parking switch and obtain a state of the vehicle's starter switch, wherein if a fault is detected in the parking switch by the controller and if a state that the vehicle's starter switch is on is obtained by the controller, the electric motor is actuated so as to hold the parking mechanism: when the brake pedal has been stepped on for a first predetermined time while the vehicle is at rest.

11. A brake system according to claim 10, wherein if a fault is detected in the parking switch by the controller and if a state that the vehicle's starter switch is off is obtained by the controller, the electric motor is actuated so as to hold the parking mechanism: when the brake pedal has been stepped on for a second predetermined time while the vehicle is at rest, wherein the controller sets the first predetermined time longer than the second predetermined time.

12. A brake system according to claim 11, wherein the controller sets the first predetermined time longer for a state in which a transmission is in a drivable position than that for a state in which it is in a non-drivable position.

13. A brake system according to claim 10, wherein the controller sets the first predetermined time longer for a state in which a transmission is in a drivable position than that for a state in which it is in a non-drivable position.

14. A brake system according to claim 10, wherein
the controller is configured as a parking switch fault detecting circuit to detect any fault in the parking switch and also is further configured as a starter switch state obtaining circuit to obtain a state of the vehicle's starter switch.

15. A brake system according to claim 10, wherein
the controller includes a parking switch fault detecting portion to detect any fault in the parking switch and further includes a starter switch state obtaining portion to obtain a state of the vehicle's starter switch.

16. A brake system comprising:
a brake mechanism configured to propel a friction member by use of a pressing member, based on operation of a brake pedal, the friction member being disposed to come into contact with a rotating member rotating with a wheel of a vehicle;

a parking mechanism operated with an electric motor to hold the wheel non-rotatably and release it; and a controller configured to actuate the electric motor, in accordance with operation of a parking switch configured to hold and release the parking mechanism, the controller further configured to detect any fault in the parking switch and obtain a state of the vehicle's starter switch, wherein if a fault is detected in the parking switch by the controller and if a state that the vehicle's starter switch is on is obtained by the controller, the electric motor is actuated so as to hold the parking mechanism: when there is detected a condition that presumes the vehicle operator's exit from the vehicle while the vehicle is at rest.

17. A brake system according to claim 16, wherein if a fault is detected in the parking switch by the controller and if a state that the vehicle's starter switch is off is obtained by the controller, the condition that presumes the vehicle operator's exit from the vehicle is that at least any one of a plurality of doors of the vehicle is open.

18. A brake system according to claim 16, wherein if a fault is detected in the parking switch while at least one of the plurality of doors of the vehicle is open, the condition that presumes the vehicle operator's exit from the vehicle is that that open door(s) are closed and reopened.

19. A brake system according to claim 16, wherein the condition that presumes the vehicle operator's exit from the vehicle is that the vehicle operator's seatbelt is taken off while the vehicle is at rest.

20. A brake system according to claim 16, wherein the condition that presumes the vehicle operator's exit from the vehicle is that the transmission is shifted to parking position.

* * * * *